(12) United States Patent
Zhou et al.

(10) Patent No.: US 6,252,899 B1
(45) Date of Patent: Jun. 26, 2001

(54) COMPLEX DESPREADING SYSTEM

(75) Inventors: Chanming Zhou; Guoliang Shou, both of Tokyo (JP)

(73) Assignee: Yozan Inc., Tokyo (JP)

( * ) Notice: Subject to any disclaimer, the term of this patent is extended or adjusted under 35 U.S.C. 154(b) by 0 days.

(21) Appl. No.: 09/055,346

(22) Filed: Apr. 6, 1998

(30) Foreign Application Priority Data

Apr. 9, 1997 (JP) .................................................... 9-105397

(51) Int. Cl.$^7$ .................................................... H04L 27/30
(52) U.S. Cl. .................... 375/140; 375/142; 375/150; 375/261; 375/298; 370/320
(58) Field of Search .................................... 375/140, 142, 375/143, 144, 148, 150, 152; 370/320, 335, 342, 441

(56) References Cited

U.S. PATENT DOCUMENTS

| | | |
|---|---|---|
| 5,329,608 | 7/1994 | Bocchieri et al. . |
| 5,729,575 | * 3/1998 | Leitch ................................... 375/268 |
| 5,790,571 | * 8/1998 | Gold et al. ............................ 375/206 |
| 5,822,365 | * 10/1998 | Lee ........................................ 375/208 |
| 5,910,950 | * 6/1999 | Ten Brink ............................ 370/342 |
| 6,005,887 | * 12/1999 | Bottomley et al. ................... 375/207 |
| 6,009,118 | * 12/1999 | Tiemann et al. ...................... 375/208 |
| 6,034,986 | * 3/2000 | Yellin ................................... 375/200 |

* cited by examiner

Primary Examiner—Stephen Chin
Assistant Examiner—Dac V. Ha
(74) Attorney, Agent, or Firm—Pillsbury Winthrop LLP (57) ABSTRACT

A compact and easily-assembled circuit for a complex despreading system, arranged such that the circuit does not contain pairs of adders at the output area. The configuration of the circuit enables the addition and subtraction of different signal components to occur before the multiplication stage and not at a pair of adders located at the output area The complex despreader system employs a complex matched filter at a receiver for despreading received signals with a QPSK system in the primary modulation and a BPSK system in the secondary modulation modulated at a transmitter. The input area of each matched filter of I and Q channels includes a pair of adders. One adder generates a first signal having a positive in-phase and a positive quadrature component. The other adder generates a second signal having a negative in-phase component and a positive quadrature component. Next, an I-channel multiplication circuit multiplies both components of the first signal by a spread code then adds the multiplication results together. Likewise, a Q-channel multiplication and addition circuit multiplies the components of the second signal by a spread code and then adds the multiplication results together.

8 Claims, 10 Drawing Sheets

COMPLEX DESPREADING SYSTEM

FIELD OF THE INVENTION

The present invention relates to a complex despreading system used in a receiver with direct-sequence code-division multiple-access (DS-CDMA) communication system.

BACKGROUND OF THE INVENTION

The development of mobile land communications has seen DS-CDMA gain importance in wideband mobile communications and Local Area Networks (LAN) because it is adequate for multimedia communications due to its changeable transmission speed. DS-CDMA performs primary and secondary modulations to modulate information into narrowband, and to spread the spectrum into wideband by spread codes, respectively.

In one type of DS-CDMA communication system, data to be transmitted is modulated in both primary and secondary modulations in the manner of Quadrature Phase-Shift Keying (QPSK). Two different spread code sequences are defined for in-phase and quadrature components of a carrier wave, and the data to be transmitted is divided into the in-phase and quadrature components. This is expressed by complex vectors in formulas (1) and (2), in which I is an information vector and C is a spread-code vector:

$$I = I_i + j \cdot I_q \quad (1)$$

$$C = C_i + j \cdot C_q \quad (2)$$

Here, Ii is an in-phase component, and Iq is a quadrature-phase component of the information I.

In the primary QPSK modulation, the carrier wave is modulated by Ii into in-phase components of the carrier wave by Ii, and it modulates the carrier wave into quadrature components by Iq. In the secondary QPSK modulation, a spread transmission signals is generated by spreading modulation using spread-code C, as shown in formulas (3) and (4):

$$S_i = I_i \cdot C_i - I_q \cdot C_q \quad (3)$$

$$S_q = I_i \cdot C_q - I_q \cdot C_i \quad (4)$$

When the noise on the transmission route is ignored, a signal R to be received at the receiver side is equal to S which is shown in formulas (5) and (6):

$$R_i = I_i \cdot C_i - I_q \cdot C_q \quad (5)$$

$$R_q = I_i \cdot C_q + I_q \cdot C_i \quad (6)$$

The receiving system performs despreading using complex conjugate code vector (Ci−j·Cq) of C on transmission. The received signal after despreading is shown in formula (7), using (5) and (6):

$$D = Di + i \cdot Dq = (Ri + j \cdot Rq) \cdot (Ci - j \cdot Cq) = (Ri \cdot Ci + Rq \cdot Cq) + j \cdot (-Ri \cdot Cq + Rq \cdot Ci) \quad (7)$$

When Ci=Cq in the formula above, the secondary modulation is Binary Phase-Shift Keying (BPSK). In this case, the received signal in the receiving system after despreading is expressed in formula (8), as derived from (7):

$$D = Di + i \cdot Dq = (Ri \cdot Ci + Rq \cdot Ci) + j(-Ri \cdot Ci + Rq \cdot Ci) \quad (8)$$

It is proposed for a DS-CDMA mobile and personal communication system that data is modulated by QPSK in both primary and secondary modulations on the upward transmission line from a mobile station to the base station, and by QPSK in the primary modulation and BPSK in the secondary modulation on the downward transmission line from base to mobile station. The secondary modulation of QPSK in the downward line makes the transmission tough against distortion caused by a power amplifier in the transmitter. However, the processing in the receiving system becomes complicated.

Figure 5:
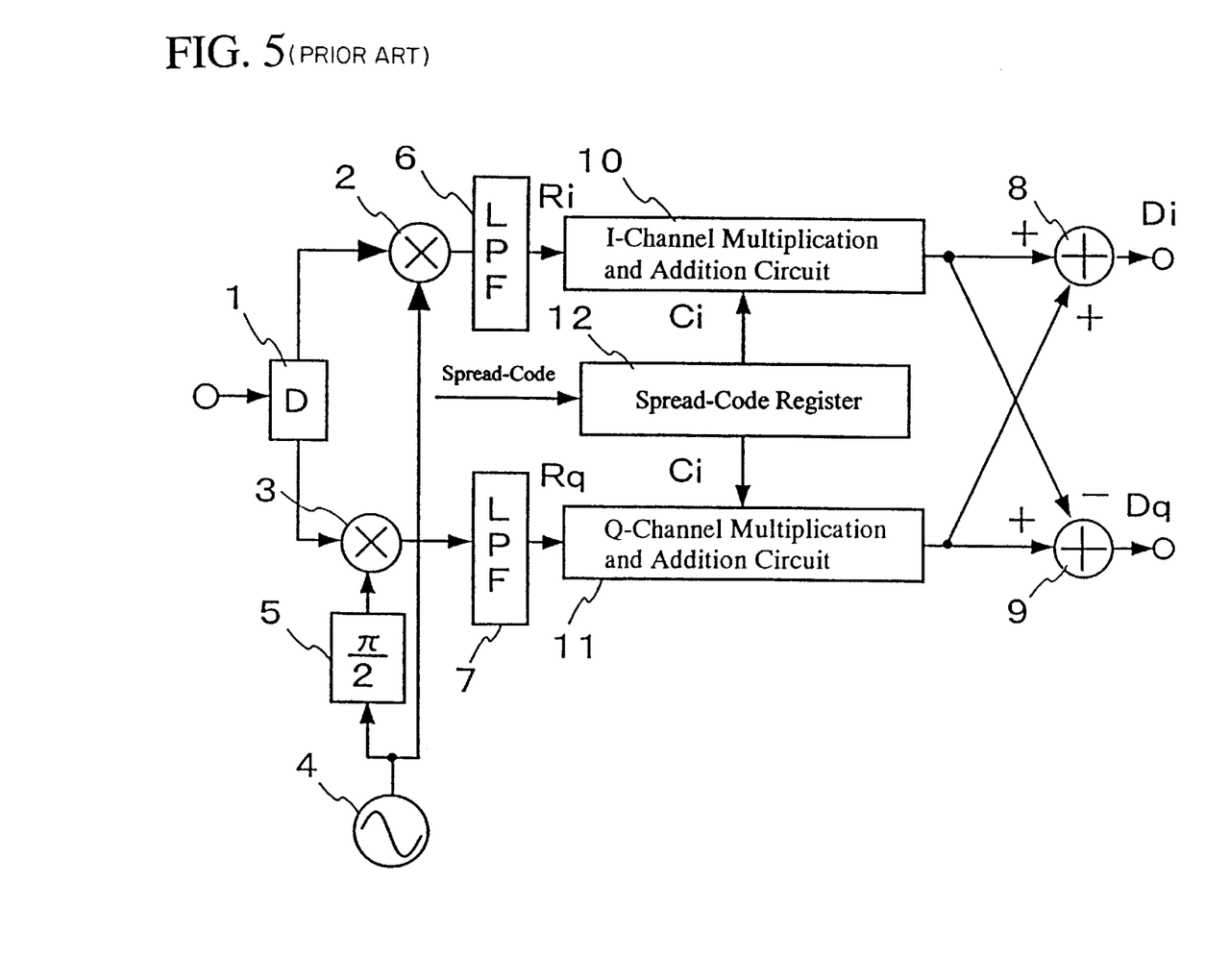
FIG. 5 shows a block diagram of the first conventional complex despreading system.

FIG. 5 shows a block diagram the conventional complex despreading system for the DS-CDMA system above. A complex matched filter, designated by reference numbers 10 and 11, is used for despreading received signals which is modulated by the primary modulation of QPSK and by the secondary modulation of BPSK. In FIG. 5, the conventional despreading system includes a distributor 1, multiplication circuits 2 and 3, a carrier wave generator 4, a π/2 phase shifter 5, Low-Pass Filters (LDP) 6 and 7, adders 8 and 9, an I-channel multiplication and addition circuit 10, a Q-channel multiplication and addition circuit 11, and a spread-code register 12.

A received signal is distributed into two lines by the distributor 1 and quadrically detected by the multiplication circuit 2 and 3. The signal on the first line is multiplied by a carrier wave from the carrier wave generator 4 in the multiplication circuit 2, then the carrier wave is deleted from the multiplication result through the low-pass filter 6. The signal on the second line is multiplied at multiplication circuit 3 by a carrier wave shifted by π/2 in phase by the phase shifter 5, then the carrier wave is deleted from the multiplication result through the low-pass filter 7. Therefore, the received signal is quadrically demodulated into a baseband signals on the two lines. The baseband signals Ri and Rq are input to the complex matched filter including consisting of multiplication and addition circuits 10 and 11. To simplify the description, the intermediate frequency amplifying stage is neglected.

The circuits 10 and 11 are matched filters for I-channel and Q-channel, to each of which the in-phase component of spread-code Ci is input from the spread-code register 12. The circuits multiply Ri and Rq by Ci, respectively, and calculate the total sum of the multiplication products, respectively so as to despread the signal on the two lines. These are correlation calculations of Ri·Ci and Rq·Cq, respectively. The adders 8 and 9 output the correlation value of Di=Ri·Ci+Rq·Ci and Dq=−Ri·Ci+Rq·Ci defined in the formula (8), respectively.

Then, the despread corresponding to the secondary modulation of BPSK is completed. So, the in-phase component Di and the quadrature component Dq of the received signal are obtained corresponding to Ii and Iq. According to Di and Dq, Ii and Iq can be reproduced. It will be understood that a complex despread is performed by the system consisting of circuits 8, 9, 10 and 11.

Figure 6:
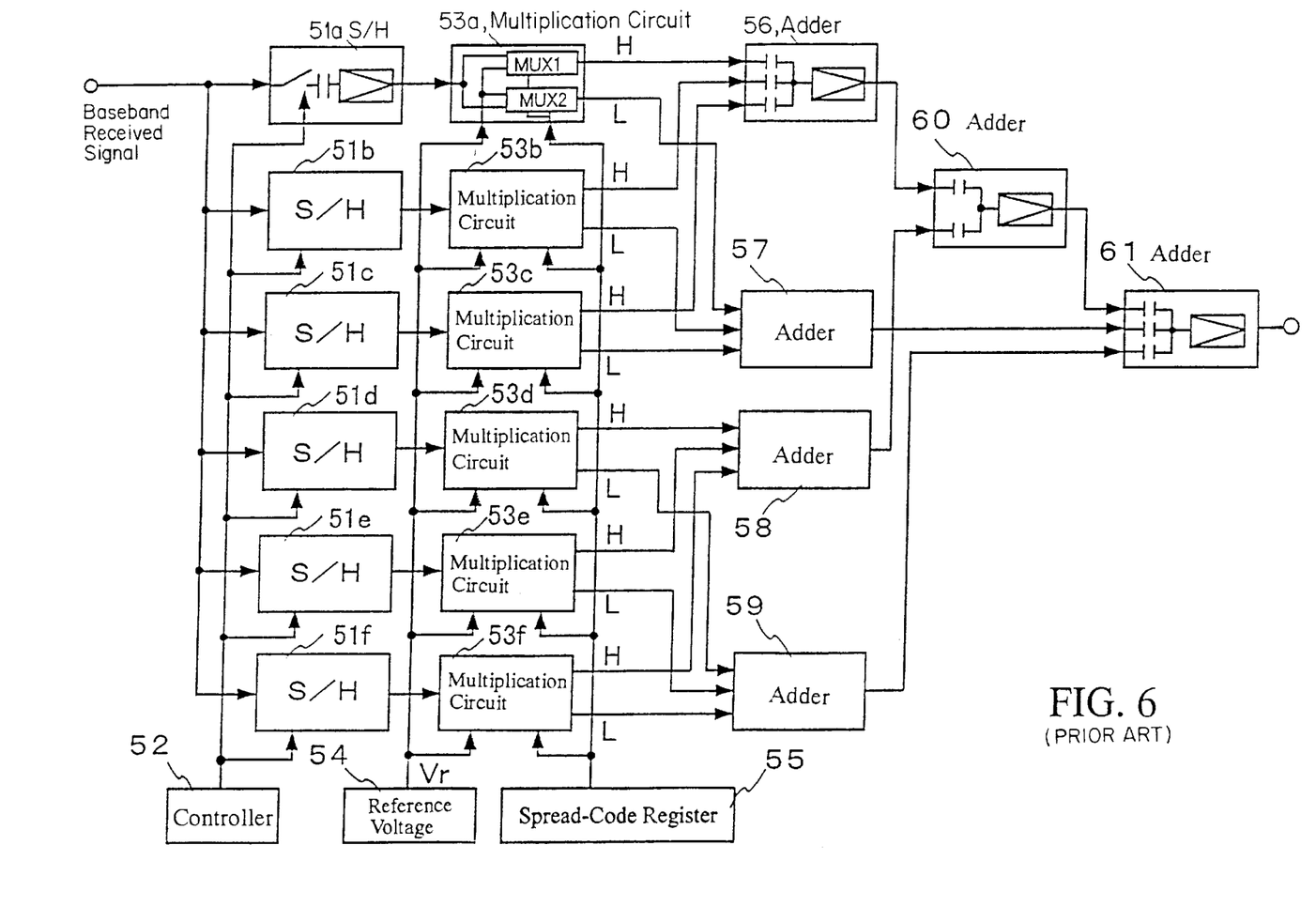
FIG. 6 shows a block diagram of an example of the multiplication and addition circuit in FIG. 5.

FIG. 6 is an exemplary block diagram of the I- and Q-channel multiplication and addition circuit in FIG. 5. In FIG. 6 components, 51a to 51f are sampling and holding circuits, 52 is a controller, component 53a to 53f are multiplication circuits, component 54 is a reference voltage generator, component 55 is a spread-code register, and components 56 to 61 are adders.

Although the circuit in FIG. 6 has six-chip spread-code sequences and six-steps delay stages for easy understanding, the actual spread-code sequence is much longer than this, and the necessary processing stages have to be set according to the length of the spread-code sequence. This multiplication and addition circuit is a matched filter circuit with small size and low power consumption.

In FIG. 6, the received baseband signal corresponds to Ri or Rq in FIG. 5. This signal is successively distributed to each of the sampling and holding circuits 51a to 51f by the controller 52 for controlling a sampling timing of the sampling and holding circuits 51a to 51f. The output from each of the sampling and holding circuits 51a to 51f is multiplied by the spread-code supplied from the spread-code register 55 in the multiplication circuits 53a to 53f, respectively. The outputs of the multiplication circuits are classified into four groups and the outputs of the groups are added together in the adders 56 to 59, respectively. A correlation value is finally obtained by adding the addition result of the adders 56 to 59 by the adders 60 and 61. A reference voltage Vr is input from the reference voltage generator to the multiplication circuits 53a to 53f for a voltage reference of the multiplication calculations, as described below.

Sampling and holding circuits 51a to 51f use analog computation circuits, which include analog switches, input capacitances, inverting amplifiers, and so on. The inverting amplifiers are structured by serially connecting CMOS inverters in three stages, with feedback capacitances (not shown) between their input and output terminals.

The inverting amplifiers works in the liner transition area of input-output performance of the CMOS inverters. As shown in the block of the sampling and holding circuit 51a, each of the sampling and holding circuits has an analog input switch, an input capacitance and an inverting amplifier. Upon opening the input switch, the baseband signal voltage received is held by the circuit 51a. The input capacitance is equal in the capacity to the capacity of the feedback capacitance. When the input of the inverting amplifier connected to the input capacitance and the feedback capacitance is at a voltage equal to the reference voltage Vr of a value of a half of the supply voltage, the held voltage is output with reversed polarity referencing the reference voltage Vr.

Controller 52 controls the analog input switch in each sampling and holding circuit 51a to 51f so as to once close the total input switches and then to successively open the input switches at the timing corresponding to each chip of the spread code. Thus, the received signal of one symbol period is always held in the sampling holding circuits 51a to 51f, and the held signal is output with reversed polarity referencing to Vr.

As shown in the block of the multiplication circuit 53a, each of the multiplication circuits 53a to 53f has two multiplexer circuits MUX1 and MUX2 with the same configuration. In MUX1 and MUX2, only one transmission gate is conductive when the control signal is high-level, and the other transmission gate is conductive when it is low-level. The first and second input terminals of MUX1 in 53a receive the output voltage from 51a and the reference voltage Vr from 54, respectively. The first and second input terminals of MUX2 in 53a receive the voltage contrary to those of MUX1: the first one receives Vr and the second receives the output voltage of 51a.

The control signals of MUX1 and MUX2 are code data of the chip corresponding to 53a among the spread-code sequence supplied from the spread-code register 55. The outputs from MUX1 and MUX2 are the H-output and L-output of the multiplication circuit 53a, respectively. When the chip value corresponding to the spread code as a control signal is "1", MUX1 outputs the input voltage from 51a and MUX2 outputs Vr. When it is 0, MUX1 outputs Vr and MUX2 outputs the input voltage from 51a.

If Vr is a half of the supply voltage, both H-outputs and L-outputs in 53a to 53f output Vr when the baseband receiving signal is 0.

The H-outputs in 53a to 53c are input to an adder 56, which includes an inverting amplifier connected to three input capacitances. The inverting amplifier is similar to that in 51a to 51f, but the input capacitance is ⅓ of the feedback capacitance and therefore, it outputs ⅓ of the output voltage sum of 53a to 53c. The H-outputs of 53d to 53f are input to an adder 58 which outputs ⅓ of the total sum of the output voltages of 53d to 53f, similar to the adder 56.

The outputs of the adders 56 and 58 are input to an adder 60, both of whose capacitance values are a half of the feedback capacitance: The adder 60 outputs a half of the total sum of the output voltages of 56 and 58. The L-outputs of 53a to 53c are input to 57, which outputs ⅓ of the total sum of the output voltages of 53a to 53c. The L-outputs of 53d to 53f are input to an adder 59, which outputs ⅓ of the total sum of output voltages of 53d to 53f.

The outputs of the adders 60, 57 and 59 are input to an adder 61 which has an input capacitance connected to the adder 60 of a capacity equal to the capacity of a feedback capacitance of the inverting amplifier. The adder 57 and 59 have input capacitances of capacities equal to a half of the capacity of the feedback capacitances. The adder 61 outputs a voltage corresponding to the total sum of the output of the adder 60, a half of the outputs of the adders 57 and 59. This means that the adder 61 generates the difference of two sums: the sum of the outputs from the sampling and holding circuit 51 (51a to 51f) which are connected to the multiplication circuit 53 (53a to 53f) and are supplied the spread-code "1" from the register 55. The sum of the outputs from the sampling and holding circuit 51 which are connected to the multiplication circuit 53 and supplied a spread-code "0". That is, the output voltage is the correlation value of the baseband received signal with the spread-code sequence.

After one-cycle correlation values are output from the adder 61, the sampling and holding circuit which has stored the oldest baseband received signal receives the signal newly input at the next timing of the baseband received signal. Simultaneously, the register 55 shifts the held spread-code sequence by one code and outputs the spread-code sequence. The correlation value between the baseband received signal at the next timing and the spread-code sequence at the same timing is obtained by the similar processing above. Since the held baseband received signal is not transferred by shifting the spread-code in the register, the transfer error of the baseband signal is prevented.

The receiving system shown in FIG. 5 has a pair of matched filters shown in FIG. 6 which includes a plurality of adders 56 to 61, and further the receiving system includes a pair of adders 8 and 9. Therefore, the total circuit is rather complicated and difficult in the circuit arrangement in an integrated circuit (IC).

Figure 8:
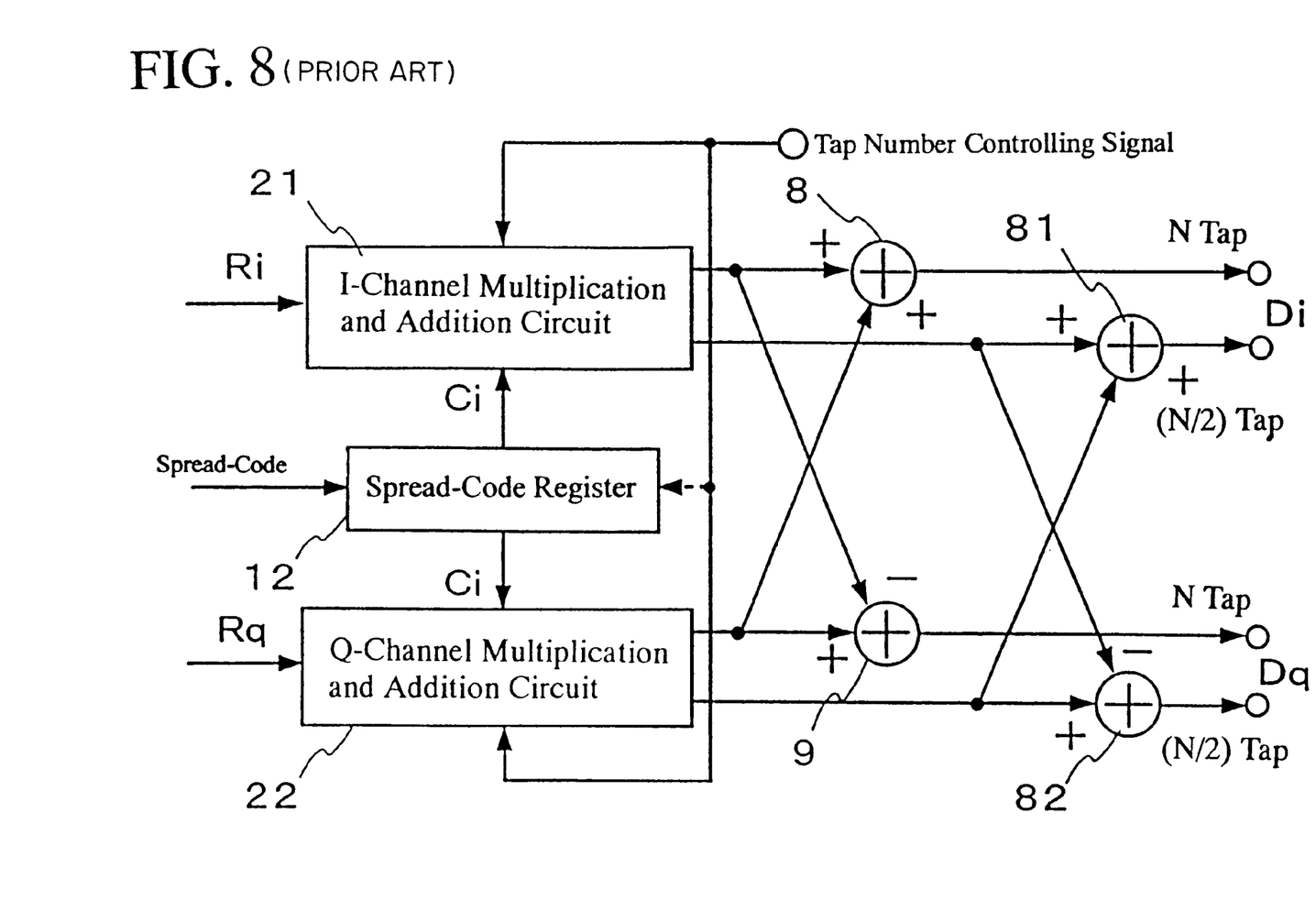
FIG. 8 shows a block diagram of the second example of a conventional complex despreading system.

FIG. 8 shows a block diagram of the second example of the conventional complex despreading system. There are provided an I-channel multiplication and addition circuit 21 and a Q-channel multiplication and addition circuit 22 similar to the circuits 10 and 11 in FIG. 5. Adders 8 and 81 are connected to the circuit 21, and adders 9 and 82 are connected to the circuits 22. The quadrature demodulator in FIG. 5 is not shown for easy understanding. The matched filters 21 and 22 are changeable in tap numbers, that is, spreading ratio. Each of the matched filters 21 and 22 has a N tap output and a (N/2) tap outputs. A spread-code register 12 similar to the register 12 in FIG. 5 outputs spread-code sequence for N chip correlation or (N/2) chip correlation. Due to increased output tap terminals in parallel for changeable spreading ratio, the necessary pairs of adders increase. It results difficulty not only in the circuit arrangement in the matched filter output area, but also in the circuit size. Especially in a large-scale integrated circuit (LSI) for a DS-CDMA mobile and personal communication system employs, it is a serious problem that the complex despreading system above is large in circuit size.

Figure 9:
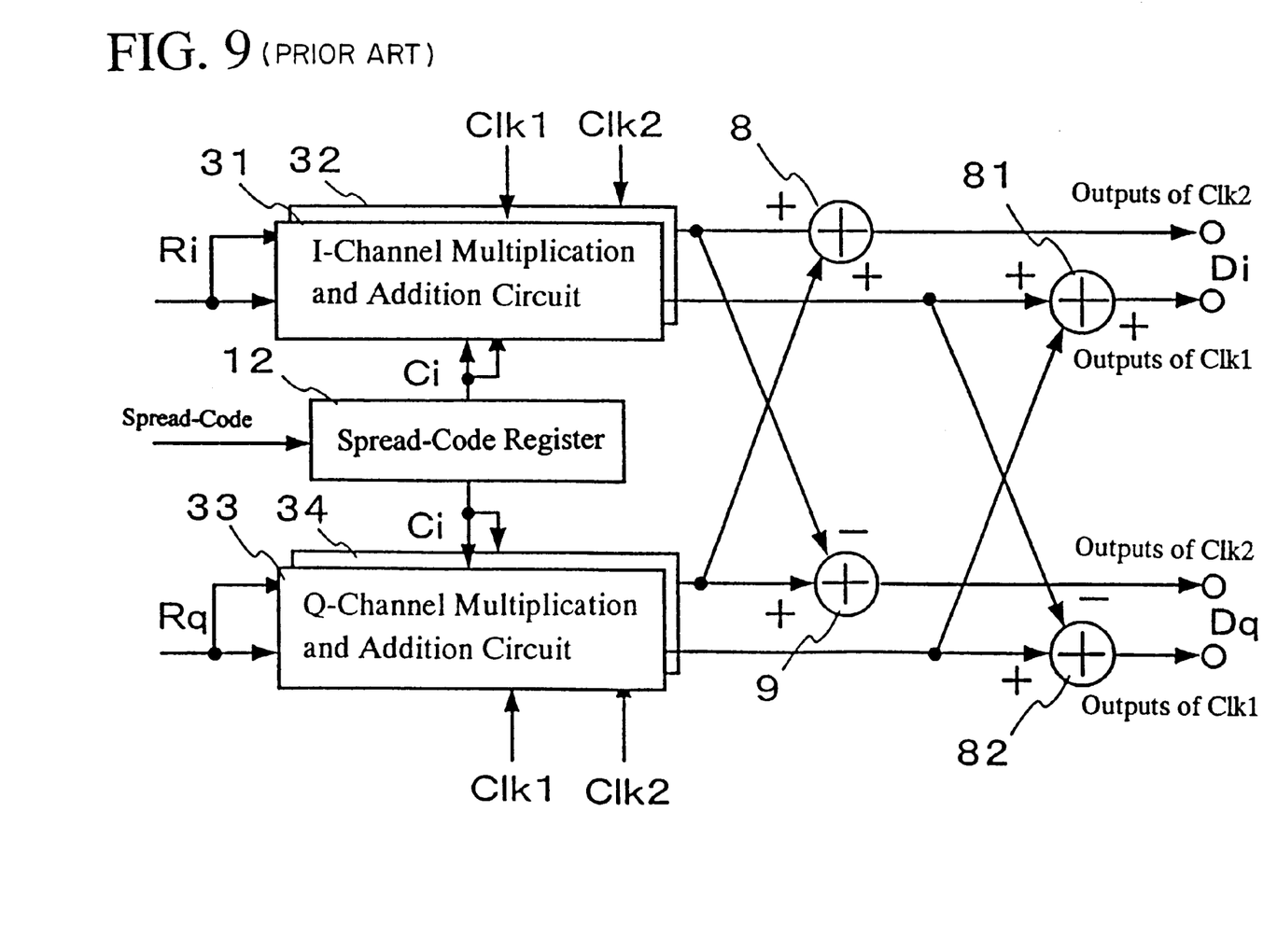
FIG. 9 shows a block diagram of the third example of a conventional despreading system.

FIG. 9 shows another conventional complex despreading system for over-sampling using matched filters 31, 32, 33 and 34. It alternately samples received signals Ri and Rq in a half-cycle of a spread-code chip (double-sampling). The sampling is performed using two clocks Clk1 and Clk2 having each other's reversed phases and the results are output in parallel. The output results of 31 and 32, and 33 and 34 are usually composed; however, each clock sometimes outputs individually, which requires two pairs of adders 8 and 9 and 81 and 82. Other components of the system are similar to those in FIG. 8, so descriptions therefor is omitted. The matched filters 31 and 32 are for I-channel, and 33 and 34 are for Q-channel. Such over-sampling system needs more circuit size and difficulty in the circuit arrangement.

Figure 10:
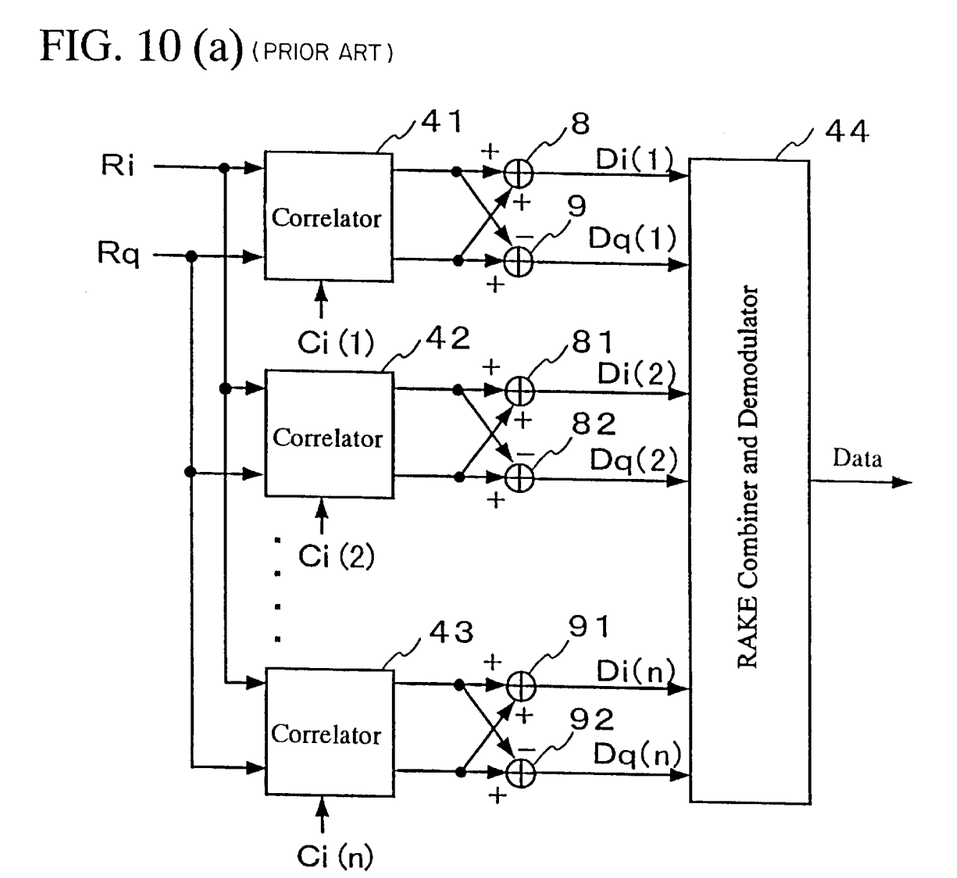
FIG. 10 shows a block diagram of the fourth example of the conventional complex despreading system.

FIG. 10 (*a*) shows a complex despreading system using a plurality of sliding correlators as shown in FIG. 10 (*b*). In FIGS. 10 (*a*) and 10 (*b*), 41 to 43 are correlators, 44 is a RAKE combination and demodulation means, 45 and 46 are multiplication circuits, 47 and 48 are integrators, and 91 and 92 are adders. This complex despreading system receives multipath signals by a plurality of sliding correlators instead of one matched filter.

In the selection of matched filters, the system receives multipath signals by only one complex matched filter because spatial integration is performed during one symbol cycle. And in the selection of sliding-correlators, 41 to 43 are necessary in response to the multipath to receive multipath signal because the computation is performed in time order.

In FIG. 10 (*a*), the in-phase and quadrature components Ri and Rq of received signals are input to 41 to 43, which receive signal sequence of spread code Ci having a predetermined number of chips in one symbol from a spread-code register not shown. Here, setting tracing loops in 41 to 43 makes it possible to receive signal sequences of spread-code Ci(1) to Ci(n) which are controlled to have the chip phase correspond to the time delay of a plurality of waves. As shown in FIG. 10(*b*), the sliding correlator 41 includes multipliers 45 and 46 for despreading the received signals Ri and Rq by multiplying the signals by a spread-code sequence Ci(n) and by integrating the multiplication results during one symbol cycle by integrators 47 and 48. The despread output from 41 undergoes addition and subtraction in adders 91 and 92 as shown in FIG. 10 (*a*), then the received signals are output as $D(n)=Di(n)+i \cdot Dq(n)$. The other correlators 42 to 4*n* work similarly to the correlator 41. The results of addition and subtraction are input to a rake-combiner & demodulator 44. In 44, the received signals are appropriately weighed and added in-phase, and the received signal is output by reducing multipath reflection.

SUMMARY OF THE INVENTION

The present invention solves the above problems, and has an object to provide a complex despreading system with a small circuit size and simple circuit arrangement.

According to the present invention, addition and subtraction of received signals of in-phase and quadrature are performed, then multiplication of the results of these addition and subtraction by a spread-code sequence is performed so that the number of times the addition and subtraction steps are performed is decreased.

PREFERRED EMBODIMENT OF THE PRESENT INVENTION

Figure 1:
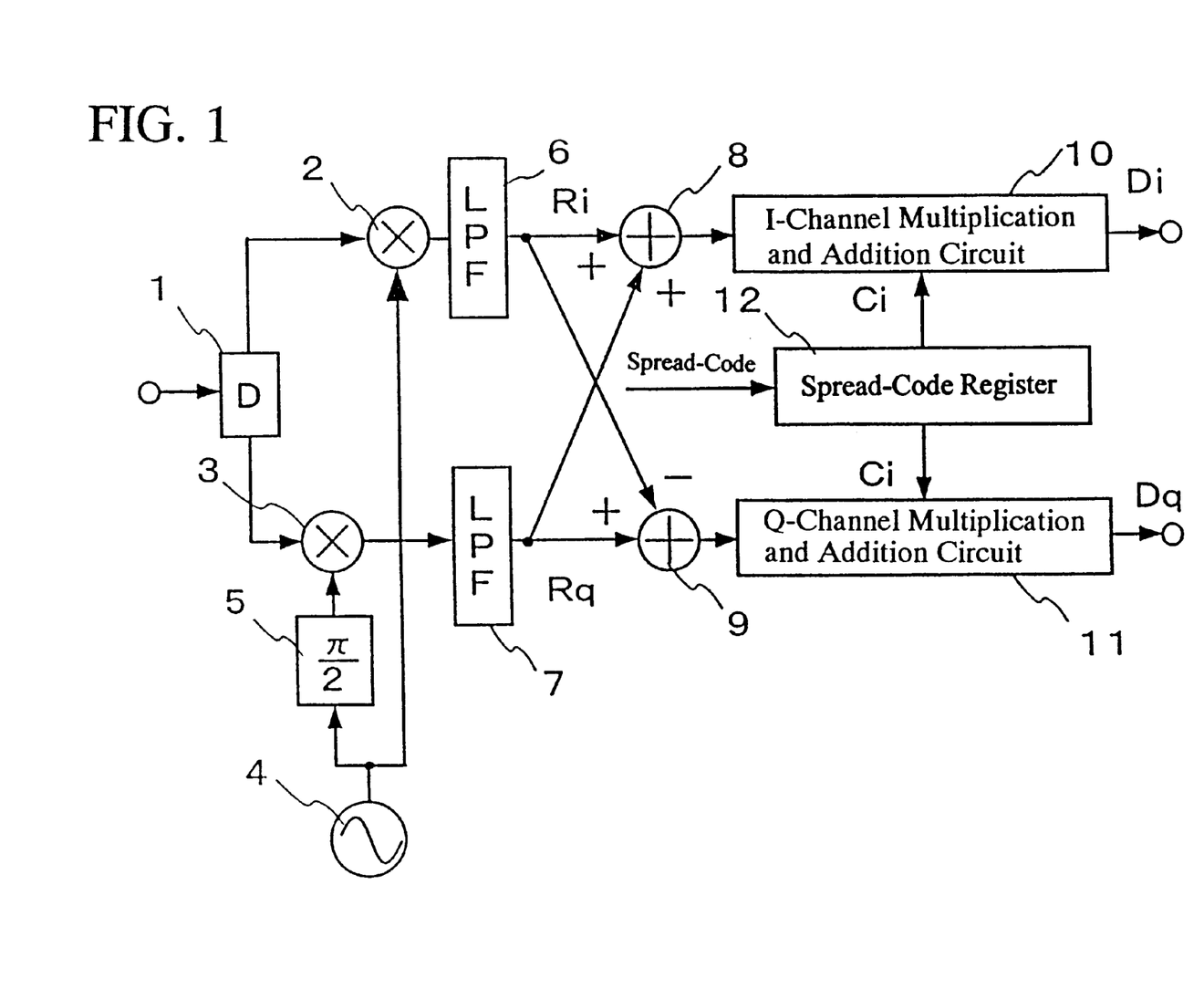
FIG. 1 shows a block diagram of the first embodiment of a complex despreading system according to the present invention.

FIG. 1 shows the first embodiment of a complex despreading system for the DS-CDMA system according to the present invention. A complex matched filter, designated by reference numbers 10 to 11, is used for despreading received signals which is modulated by the primary modulation of QPSK and by the secondary modulation of BPSK. There are shown similar components to those In FIG. 5, that is, the complex despreading system includes a distributor 1, multiplication circuits 2 and 3, a carrier wave generator 4, a π/2 phase shifter 5, Low-Pass Filters (LPF) 6 and 7, adders 8 and 9, an I-channel multiplication and addition circuit 10, a Q-channel multiplication and addition circuit 11, and a spread-code register 12.

A received signal is distributed into two lines by the distributor 1 and quadrically detected by the multiplication circuit 2 and 3. The signal on the first line is multiplied by a carrier wave from the carrier wave generator 4 in the multiplication circuit 2, then the carrier wave is deleted from the multiplication result through the low-pass filter 6. The signal on the second line is multiplied at multiplication circuit 3 by a carrier wave shifted by π/2 in phase by the phase shifter. Then, the carrier wave is deleted from the multiplication result through the low-pass filter 7. The received signal is quadrically demodulated into a baseband signals Ri and Rq on the two lines.

The baseband signals Ri and Rq are input to the pair of adders 8 and 9 for addition and subtraction before the matched filters 10 and 11 of I- and Q-channels. The adders generates signals of (Ri+Rq) and (−Ri+Rq), respectively. Circuit 10 multiplies the signal (Ri+Rq) by a spread-code Ci, then add the multiplication results together. The circuit 11 multiplies the signal (−Ri+Rq) by a spread-code Ci, then add the multiplication results together. It means the addition or subtraction of different components, in-phase and quadrature components, is performed first before the multiplication. The outputs Di and Dq of the matched filters are $Di=Ri \cdot Ci+Rq \cdot Ci$ and $Dq=-Ri \cdot Ci+Rq \cdot Ci$ shown in the formula (8) above. The information transmitted is obtained from the correlation outputs similar to the conventional system. The (Ri+Rq) and (−Ri+Rq) operations may be changed into (Ri−Rq) and (Ri+Rq), respectively, according to the spreading processing on transmission side.

Then, the despread corresponding to the secondary modulation of BPSK is completed. So, the in-phase component Di and the quadrature component Dq of the received signal are obtained corresponding to Ii and Iq. According to Di and Dq, Ii and Iq can be reproduced. It will be understood that a complex despread is performed by the system consisting of circuits 8, 9, 10 and 11.

Since the adders are positioned at the input side of the matched filters, the circuit layout becomes easy because there are not as many connections and components in the input side as compared to the output side. It makes the designing of LSI easy.

Figure 2:
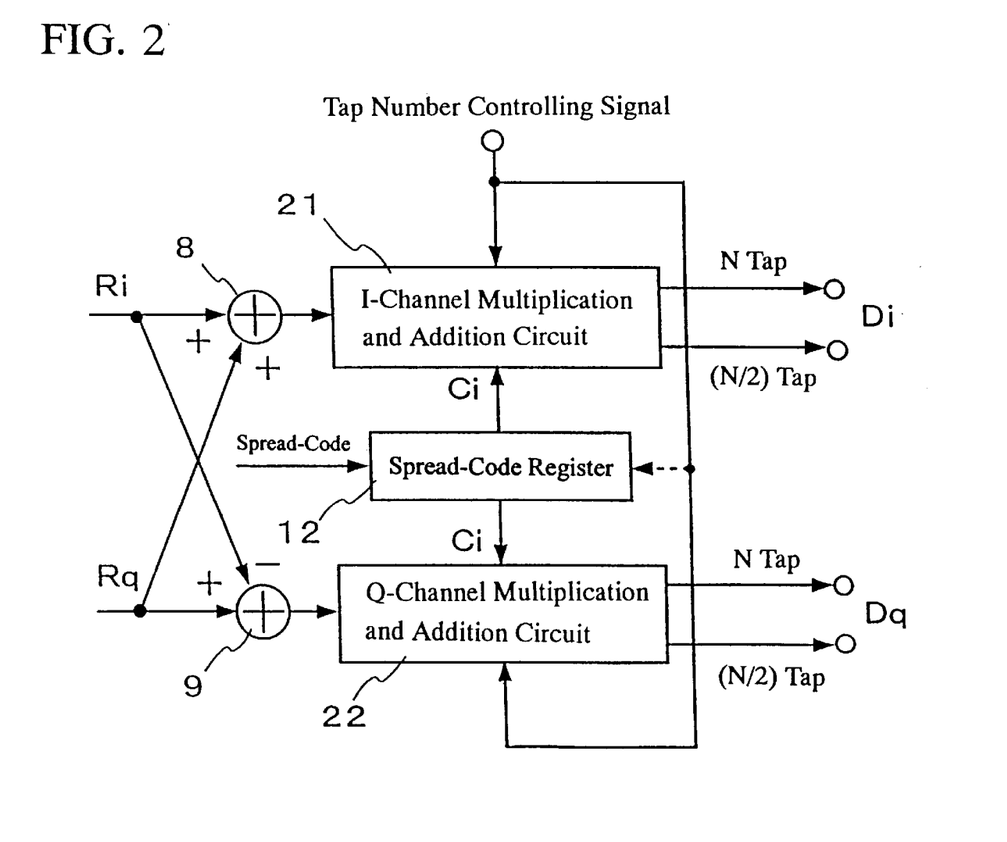
FIG. 2 shows a block diagram of the second embodiment.

FIG. 2 shows the second embodiment of a matched filter having a plurality of tap output terminals. Components similar to those of the system in FIGS. 5 and 8 are designated by the same references, and description therefor is omitted.

Similarly to the first embodiment, the adders 8 and 9 are positioned before the matched filters 21 and 22 which have output terminals of N tap and (N/2) tap. The advantages of the first embodiment is also obtained in this embodiment of easy layout in LSI. The tap number of the output tap terminal may be other than (N/2) and the number of output tap terminals may be three or more. The spread-code lengths for deciding the spread ratio are 16, 32, 64 and 128 chips, for example, and the tap numbers can be set in a plurality of ways according to the chip numbers. When one or more taps are not needed the number of taps may be changed and the circuits for the taps are disconnected from the power supply in order to save electrical power consumption. These taps may be used for other purpose, if possible.

Figure 3:
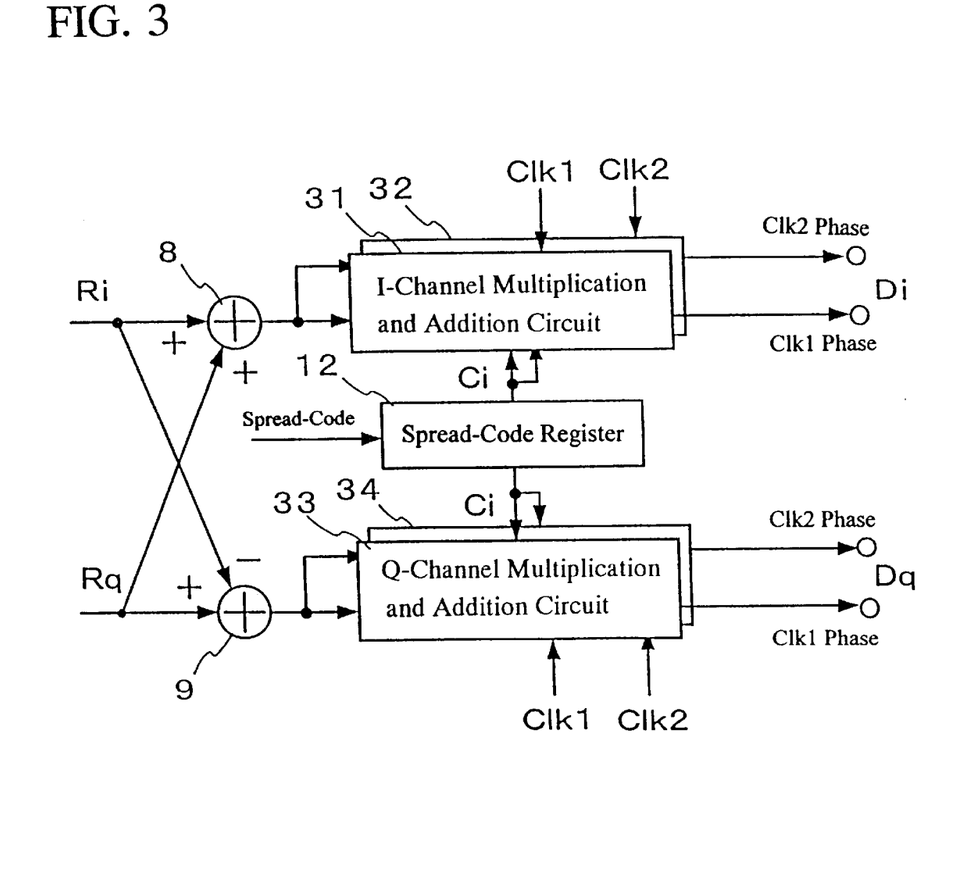
FIG. 3 shows a block diagram of the third embodiment.

FIG. 3 shows a block diagram of the third embodiment of the double sampling. Components similar to those of the system in FIGS. 5 and 9 are designated by the same references, and description therefor is omitted. There are adders 8 and 9 before the matched filters 31 and 32 for in-phase component and matched filters 33 and 34 for quadrature components. The adder 8 is connected to the matched filter 31 and 32, the adder 9 is connected to the matched filters 33 and 34. The matched filters 31 and 32 alternately sample the signal (Ri+Rq) on every half-cycle of chip time so as to generate the output Di, and the matched filters 33 and 34 alternately sample the signal (−Ri+Rq) on every half-cycle of chip time so as to generate the output Dq. The half-cycle sampling is performed in response to two clocks Clk1 and Clk2. Since the adders are positioned in front of the matched filters, the circuit is not as complicated as the conventional circuit. Therefore, it is not only easy to design the circuit, but also possible to make a small-size circuit.

Figure 4:
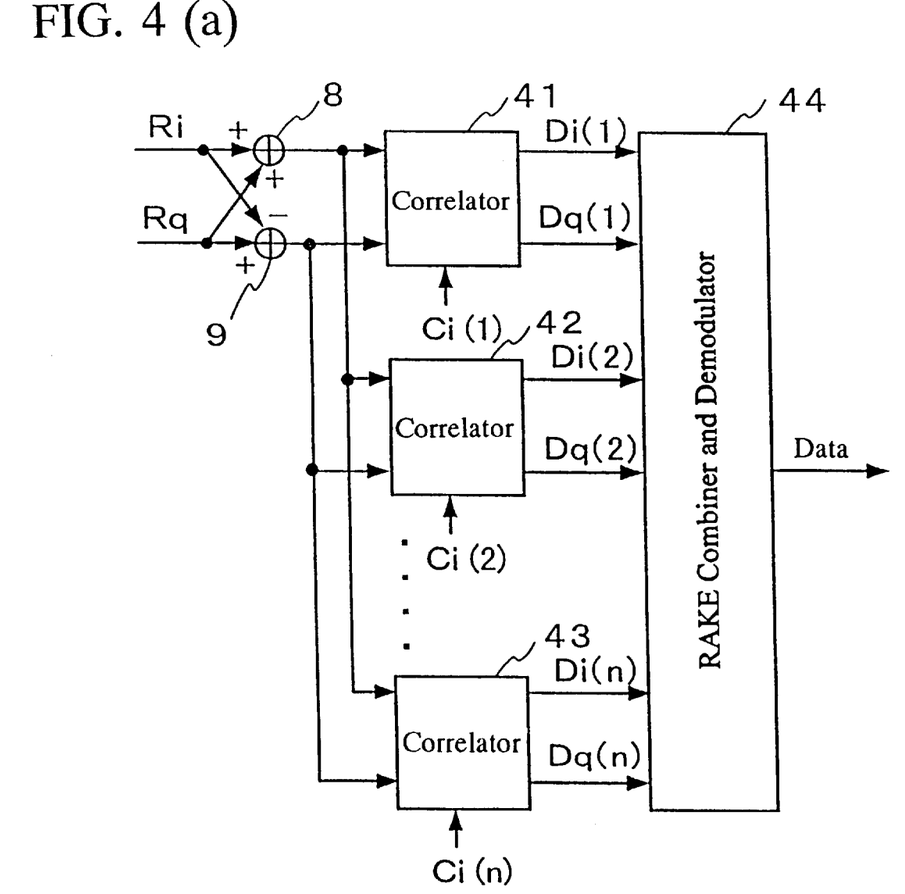
FIG. 4 shows a block diagram of the fourth embodiment.

FIG. 4 (a) shows a block diagram of the fourth embodiment wherein the matched filters in the above embodiments are substituted by sliding correlators. Similarly to the above embodiments, there are provided adders 8 and 9 for receiving (Ri+Rq) and (−Ri+Rq), respectively. The outputs of the adders 8 and 9 are input parallelly to a plurality of sliding correlators 41 to 4n, each of which, for example the sliding correlator, multiples the outputs from the adders 8 and 9 by a spread-code sequence so as to generate outputs D(i)=Di(i)+j Dq(i). The sliding correlator is much smaller in size and electrical power consumption than the matched filter, while the initial acquisition is rather slower than the matched filter. FIG. 4 (b) is a circuit diagram of the sliding correlator 41(i) which includes a pair of multipliers 45 and 46 for multiplying the input signal of I- and Q-components by the spread-code sequence. The outputs of the multipliers 45 and 46 are input to the integrators 47 and 48 which output Di(i) and Dq(i).

The outputs of the sliding correlators 41 to 4n are input to a rake-combiner & demodulator 44 which combines multipath signals extracted by the sliding correlators, then demodulate the information transmitted.

Figure 7:
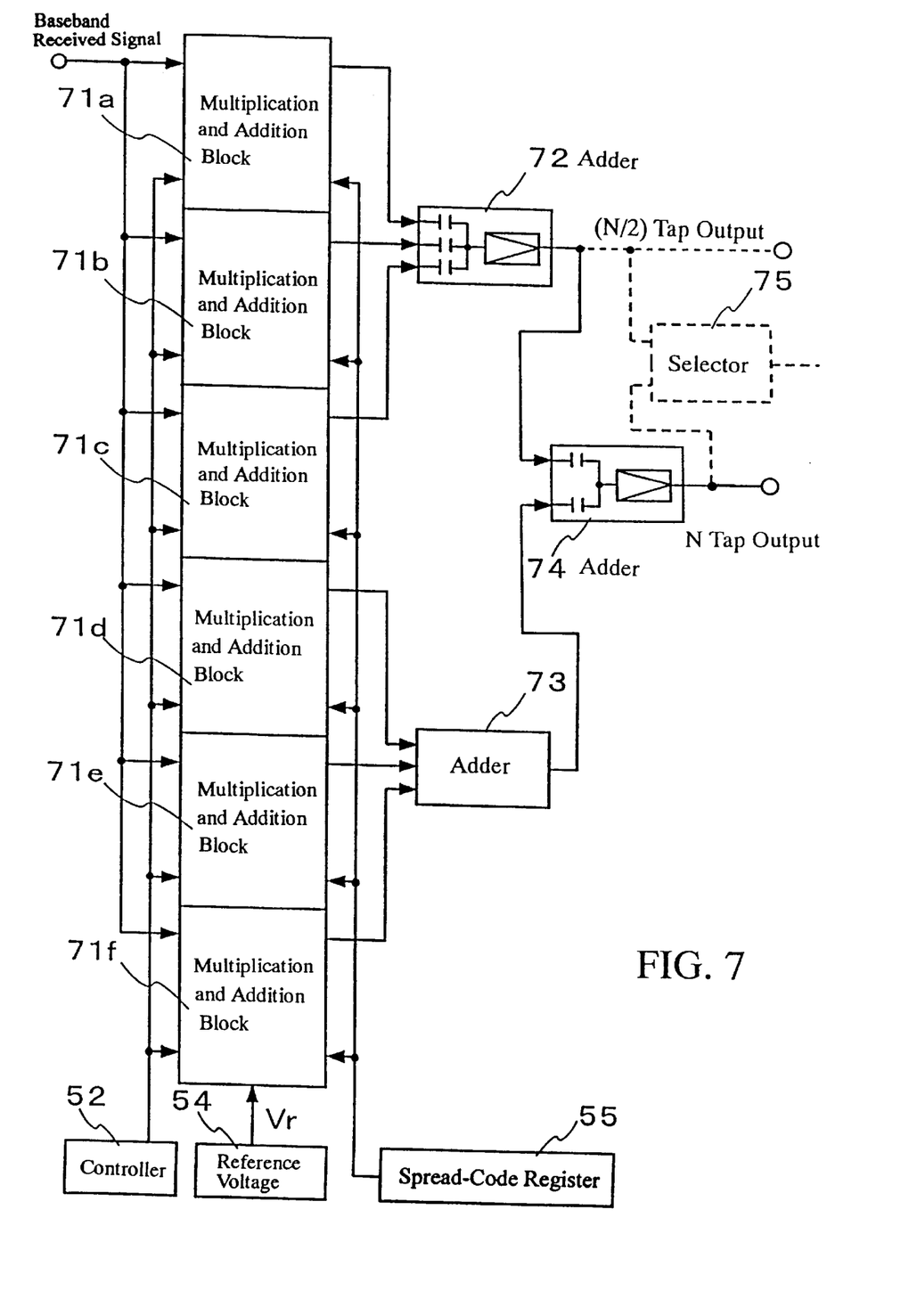
FIG. 7 shows a matched filter applied to the present invention.

FIG. 7 shows an embodiment of a matched filter including a plurality of sub-matched filters 71a to 71f similar to the matched filter in FIG. 1, each having an output corresponding to each of a plurality of the tap output terminals as described in the second embodiment in FIG. 2. By dividing the matched filters in to a plurality of sub-matched filters, the plurality of outputs are readily obtained. This embodiment can also be applied to a long spread-code sequence by the sequential sub-matched filters. The sub-matched filters may have taps of different number. The outputs of the sub-matched filters 71a to 71c are added by an adder 72, and the outputs of sub-matched filters 71d to 71f are added by an adder 73. An output of the adder 72 is output as the (N/2) tap output in FIG. 2 or input to an adder 74. The adder 74 adds the output from the adder 74 to an output from the adder 73 so as to generate the N tap output in FIG. 2. The N tap output and the N/2 tap output are selected by a selector 75. The N/2 tap output may be also output directly from the adder 72. The spread-code sequence is stored in a spread-code register 55 which has the maximal length of the spread-code sequence. A multiplexer (not shown) is connected to the spread-code register for receiving outputs from other stages than the first stage of the register and for outputting one of the outputs to the first stage. The multiplexer is controlled so that one of the outputs is selected to be circulated and fed back to the first stage. Then, the length of the spread-code sequence can be changed corresponding to the number of taps, that is, the spreading ratio. The sampling and holding of the sub-matched filters is controlled by a controller 52.

As the present invention needs no addition circuit to carry out the despreading in the output area which has to be narrowed by a plurality of circuit components and connecting wires, the circuit of the present invention arrangement is easier to design. When a plurality of outputs are generated because a multiplication and addition circuit has a plurality of tap outputs, or a plurality of multiplication and addition circuits or correlators are set, the complex despreading system of circuit size can be smaller.

What is claimed is:

1. A complex despreading system comprising:
    i) a first adder for outputting a sum of in-phase and quadrature components of a received signal quadrically detected;
    ii) a first correlation means for outputting a correlation of said output of said first adder with a spread-code;
    iii) a second adder for outputting a difference between said in-phase and quadrature components; and
    iv) a second correlation means for outputting a correlation of said output of said second adder with a spread-code.

2. A complex despreading system as claimed in claim 1, wherein each said first and second correlation means comprises a plurality of parallel correlation means driven by shifted clocks for over-sampling.

3. A complex despreading system as claimed in claim 1, wherein said first and second correlation means are first and second matched filters, respectively.

4. A complex despreading system as claimed in claim 1, wherein said first and second correlation means are a plurality of sliding correlators parallelly connected to said first or second adder for processing a multi-path signal.

5. A complex despreading system as claimed in claim 3, wherein said first matched filter comprises a plurality of tap output terminals and said second matched filter comprises a plurality of tap output terminals corresponding to the said terminals of said first matched filter.

6. A complex despreading system as claimed in claim 3, wherein each of said first and second matched filters comprises a plurality of sub-matched filters having outputs as said tap output terminals.

7. A complex despreading system as claimed in claim 3, wherein said spread-code for each of said first and second matched filters is stored in a spread-code register comprising:
    i) a shift-register having a plurality of stages from the first to the last stage, an input to said first stage and outputs from said stages corresponding to the tap output terminals; and
    ii) a multiplexer for receiving said outputs of said shift-register and for selectively outputting one of said outputs to said first stage of said shift-register. one said outputs to said first stage of said shift-register.

8. A complex despreading system as claimed in claim 2 or 3, further comprising a rake-combiner.

* * * * *